INVENTORS.
RICHARD A. BUTLER,
JERRY KARLOVSKY, JR.
BY
their ATTORNEY.

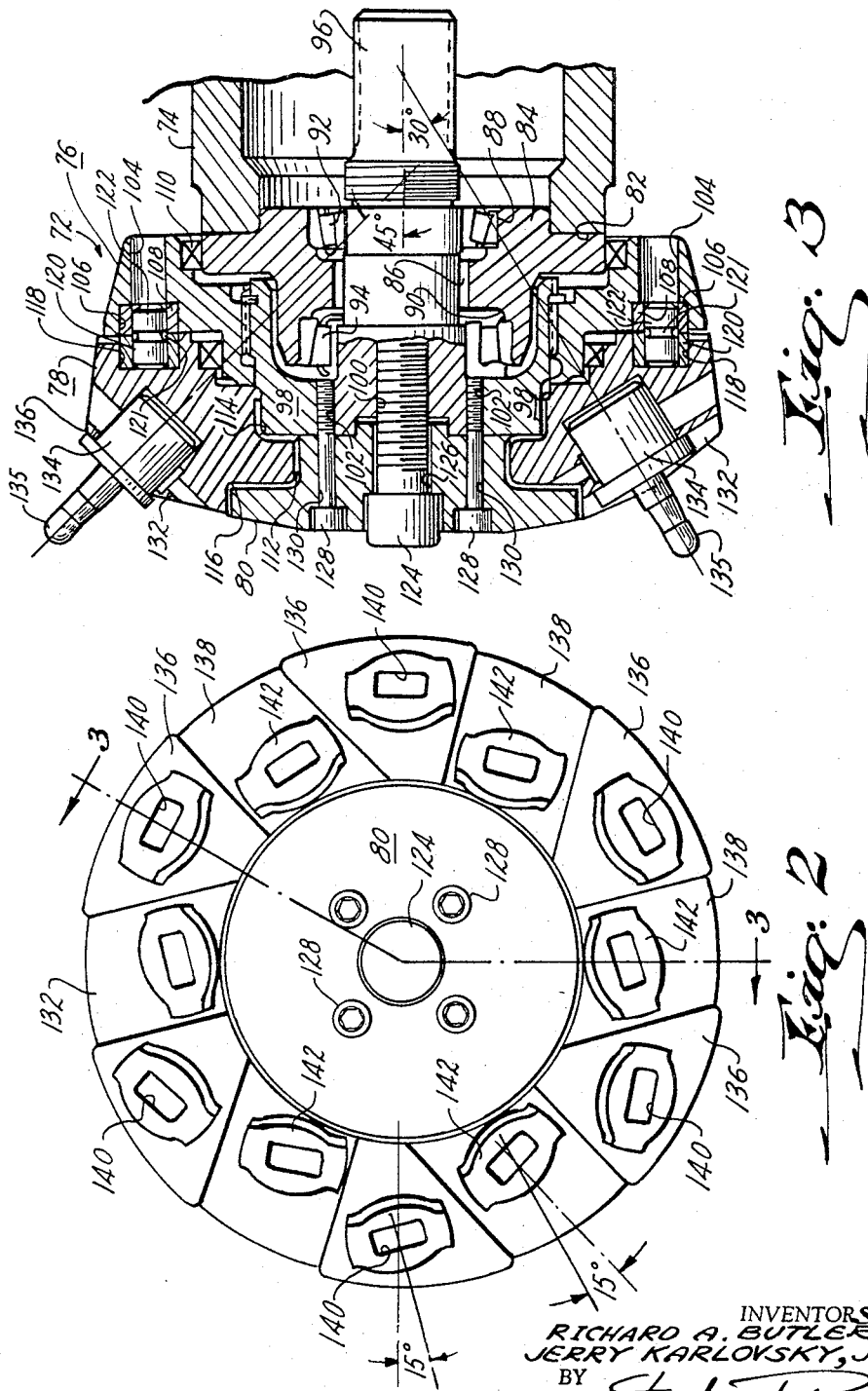

United States Patent Office 3,408,110
Patented Oct. 29, 1968

3,408,110
CUTTER HEAD HAVING A TORQUE RESPONSIVE SHEARABLE CONNECTION
Jerry Karlovsky, Jr., Nashville, and Richard A. Butler, Carlyle, Ill., assignors to National Mine Service Company, Pittsburgh, Pa., a corporation of West Virginia
Original application Dec. 2, 1966, Ser. No. 598,858. Divided and this application July 3, 1967, Ser. No. 650,919
6 Claims. (Cl. 299—86)

ABSTRACT OF THE DISCLOSURE

A cutter head rotatably mounted on a support member. The cutter head has an annular body portion secured to a drive shaft extending axially through the support member. The drive shaft is supported in a bearing support and rotates the body portion relative to the support member. An annular front head portion is positioned in abutting relation with the front face of the cutter head body portion. A cap member, secured to the drive shaft, retains the front head portion in position on the body portion. The head portion has an irregular convex front cutting face with cutter bits extending generally forwardly from the face and at angles of about 45° and 30° to the axis of the drive shaft. The bits are secured to the face at an angle of about 15° to the bit transverse axis. The rear face of the annular front head has a plurality of recessed portions therein and the body portion has a plurality of passageways aligned with the recessed portions. Shear pins extend through the passageways into the recessed portions to connect the head portion to the body portion for rotation therewith. When the resistance exceeds the shear strength of the shear pins, the cutter head portion is disengaged from the body portion and prevents damage to the drive gearing for the cutter head body portion.

Cross-reference to related applications

This application is a division of copending application Ser. No. 598,858 entitled "Mining Machine Having Adjustable Rotary Cutter Heads on Rotary Turrets," filed on December 2, 1966 and now Patent No. 3,331,636.

Background of the invention (1) Field of the invention.—This invention relates to a continuous mining machine and more particularly to a boring type continuous mining machine that has a plurality of rotatable turrets and a plurality of rotatable cutter heads positioned on each of the rotatable turrets.

(2) Description of the prior art.—Recently a drilling head has been developed that can drive large diameter entries or bores into hard material such as iron ore or the like at a much faster rate than other known conventional boring machines. The drilling head has a cylindrical body portion and a conical front end portion. A plurality of rotatable plates with picks or cutting devices extending therefrom are secured to the conical front end portion in lateral spaced relation to the longitudinal axis of the cylindrical body portion. The axis of each rotatable plate is inclined relative to projected planes that include the longitudinal axis of the cylindrical body portion and the axis of each rotatable plate also diverges angularly away from the longitudinal axis of the cylindrical body portion. Drive means are provided to rotate the head about the longitudinal axis of the cylindrical body portion and to rotate the angularly positioned plates about their respective axes. The plates, therefore, revolve about the longitudinal axis of the body portion as the body portion rotates and rotate about their individual axes. The drilling head is described in U.S. Patent Re. 25,470 entitled, "Drilling Head for Sinking Shafts, Galleries or the Like."

It is believed that the rapidity of dislodging the hard materials is attributable to the manner in which the cutting devices secured to the front or top face of the rotatable plates contact or strike the material to be dislodged. The picks have their cutting edges facing toward the direction of rotation of the plates and the plates are so positioned that the picks on each plate strike one after the other into the material to be dislodged and then are immediately withdrawn. The rotation of the cylindrical body portion in conjunction with the rotation of the rotary plates provides a drilling head where the rotary plates are continuously revolving about the axis of the body portion and the picks or cutting devices are continuously dislodging the material in parallel elongated arcuate paths that intersect the circular path circumscribed by the rotary plates as they revolve about the longitudinal axis of the cylindrical body portion.

The drilling head has a fixed diameter body portion with an Archimedean screw portion thereon to convey the cuttings dislodged by the rotary plates at the front end of the drilling head rearwardly to a suitable receiver. The cylindrical body portion of fixed diameter limits the diameter of the bore or entry that can be made with the drilling head and the Archimedean screw portion limits the amount of material that can be conveyed rearwardly through the bore to the receiver.

The continuous mining machine includes a plurality of rotatable boring heads or turrets that have a plurality of rotatable cutter heads positioned thereon in spaced lateral relation to the longitudinal axis of the respective turret. The cutter heads are positioned on the front end of the turrets in a preselected angular relation to the axis of the turret. Certain of the cutter heads are adjustable laterally relative to the axis of the turret so that the effective diameter of the turrets may be rapidly changed and the continuous mining machine can dislodge material from seams of different thickness.

Summary of the invention

Briefly, the invention is directed to a cutter comprising an annular front head carrying cutter bits and a driven body portion, the head and body portion being connected together by shear pin means for the transmission of torque. The shear pin means are adapted to sever in torsional overload to protect the gearing which is transmitting drive to the cutter from damage.

Brief description of the drawings

In the drawings:
FIGURE 2 is a view in front elevation of one of the cutter heads with the cutting bits removed.
FIGURE 3 is a view in section of the cutter head taken along the line 3—3 (FIGURE 2) and including cutter bits positioned in the respective bit receivers.

Figure 1:
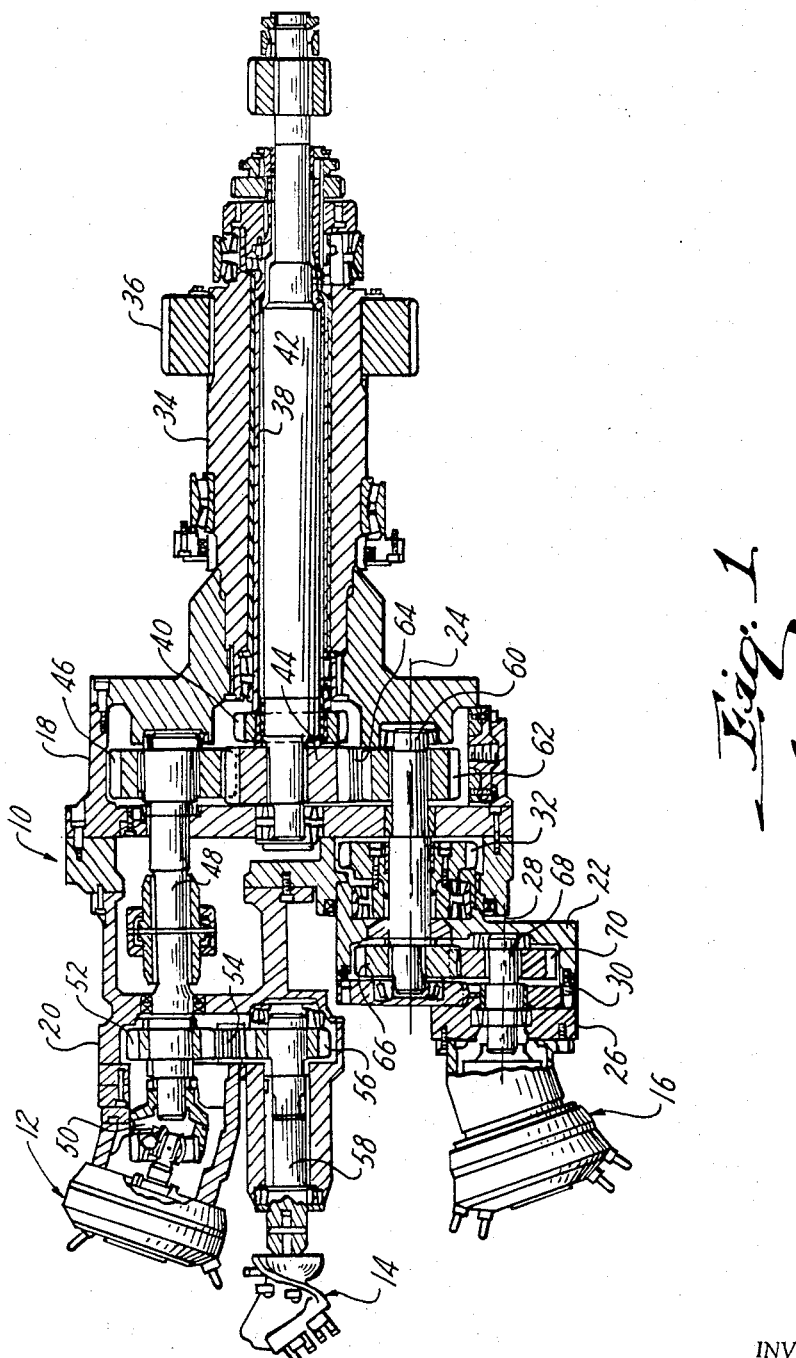
FIGURE 1 is a view partially in section illustrating the drive means for the outer and intermediate cutter heads and the pilot drill.

There is illustrated in FIGURE 1 a turret assembly generally designated by the numeral 10 that has a modified drive arrangement for the intermediate cutter head 12, the pilot drill 14 and the outer cutter head 16. The turret assembly has a main housing 18 with a forwardly extending support 20 for the intermediate cutter head 12.

Rotatably supported and extending forwardly from the housing 18 is an inner turntable 22 that is rotatable relative to the housing 18 about an axis 24. Upon rotation of turntable 22 about the axis 24 the outer cutter head 16 moves toward and away from the intermediate cutter head 12. Connected to the inner turntable 22 is an outer turntable 26 that is rotatable relative to the inner turntable 22 about an axis 28. The axis 28 is parallel to and displaced laterally from the axis 24. The outer turntable 26 is secured to the inner turntable 22 by bolts 30 arranged in a circular configuration so that the outer turntable 26 may be rotated relative to inner turntable 22 by removing the bolts 30 and repositioning the outer turntable 26 and aligning the bolt holes to obtain the desired angularity of the outer cutter head 16. The inner turntable 22 is rotated relative to the housing 18 by a suitable mechanism. The inner turntable has an externally toothed gear portion 32 and upon rotation of the externally geared portion 32 the inner turntable 22 rotates about the axis 24. Adjustment or rotation of outer turntable 26 is accomplished by removing the bolts and rotating the outer turntable 26 relative to the inner turntable 22 about the axis 28.

The turret 10 has a cylindrical end portion 34 supported in the main transmission housing with drive gear 36 splined thereto. Within the cylindrical end portion 34 there is positioned a tubular shaft 38 that has a gear 40 secured thereto and extending into the housing 18. The gear 40 is drivingly connected by means of a pair of gears and a shaft (not shown) to the externally geared portion 32 of inner turntable 22. Thus by rotating the cylindrical shaft 38 the inner turntable 22 is rotated about the axis 24 to adjust the relative position of outer cutter head 16.

Positioned within the tubular shaft 38 is a drive shaft 42 for the cutter heads 12 and 16 and the pilot drill 14. The shaft 42 is driven by suitable drive means and the gear 44 secured to the shaft 42 meshes with gear 46 connected to shaft 48. The shaft 48 is in turn directly connected through the universal joint 50 to the intermediate cutter head 12. Thus rotation for intermediate cutter head 12 is provided from input shaft 42 through gears 44 and 46 and shaft 48.

Shaft 48 has a gear 52 secured thereto and rotatable therewith that meshes with an intermediate gear 54 supported on a suitable shaft (not shown) to drive gear 56 connected to shaft 58 that is in turn directly connected to the pilot bit 14. With this arrangement, drive for the pilot bit 14 is provided from shaft 42 through gears 44 and 46, shaft 48, gears 52, 54, and 56 and shaft 58.

The drive for the outer cutter head 16 is provided by means of a shaft 60 that has a gear 62 connected to its end portion. An idler gear 64 suitably supported on an idler shaft (not shown) drivingly connects gear 44 to gear 62 to thus provide rotation to shaft 60 in the same direction as drive shaft 42. The idler gear 64 is in the same plane as gears 44 and 62 and may be located above or below the pair of gears 44 and 62. The shaft 60 is suitably supported in the housing 18 and turntables 22 and 26 and has a gear 66 connected thereto within the inner turntable 22. A shaft 68 is secured to the outer cutter head 16 and has a gear 70 secured thereto that meshes with the gear 66. With this arrangement, drive is provided from input shaft 42 to the outer cutter head 16 through gears 44, 64, 62, shaft 60 and meshing gears 66 and 70 to thus rotate shaft 68 and outer cutter head 16 in the opposite direction to the direction of rotation of shaft 42 and in the same direction of rotation as inner cutter head 12.

The configuration illustrated in FIGURE 1 reduces the number of shafts and gears required to rotate the cutter heads 12 and 16 from the input shaft 42. With this arrangement, it is possible to increase the size or strengthen the drive gears without increasing appreciably the size of the housing. Although only one modification of a drive arrangement for the inner and outer cutter heads is illustrated it should be understood that other drive arrangements are possible without departing from the invention herein described.

FIGURES 2 and 3 illustrate in detail a cutter head generally designated by the numeral 72 and is rotatably supported on a cylindrical support member 74 and has an annular body portion 76, an annular front head portion 78 and a cap 80.

Seated on the front annular surface 82 of the cylindrical support member 74 is an annular bearing support 84 that has a central passageway 86 therethrough and a pair of spaced shoulder portions 88 and 90 for bearings 92 and 94. A shaft 96 has an intermediate portion positioned in the axial passageway 86 of cylindrical support member 74 and rotatably supported by bearings 92 and 94. The shaft 96 has a radially extending and inturned flanged end portion 98 with an axial threaded bore 100 and a plurality of spaced threaded bores 102 that are spaced radially from the bore 100. The cutter head annular body portion 76 is splined to the shaft radially flanged end portion 98 for rotation therewith and has a plurality of passageways 104 arranged adjacent the peripheral edge. The passageways 104 have an enlarged portion 106 in which a cylindrical receiver 108 is positioned. The receiver terminates at the front surface of the annular body portion 76. A suitable seal 110 is positioned between the outer surface of the bearing support 84 and the inner surface of the annular body portion 76.

The cutter head annular front head portion 78 has a central bore 112 with an enlarged inner end forming a shoulder 114 and an enlarged outer end forming a shoulder 116. The rear surface of annular front head portion 78 has a plurality of cylindrical recessed portions 118 adjacent the peripheral edge with cylindrical receivers 120 positioned therein. The cylindrical recessed portions 118 are arranged circumferentially and aligned with the passageways 104 in the body portion 76. Shear pins 122 are positioned in the aligned passageways 104 and recessed portions 118 to secure the annular head portion 78 to the body portion 76. If during the cutting operation the bits encounter a resistance or opposition to rotation that exceeds the shear strength of the pins 122, the pins will shear or part along the central recessed portion 121 and permit the annular front head portion 78 to rotate freely relative to the body portion 76 and thus literally disconnect the annular front head portion 78 from the drive means for rotating the cutter heads 72. With this arrangement, the drive gearing is protected from damage due to excessive damaging load or forces.

The annular front head portion 78 is maintained in position on the body portion 76 by the flanged cap member 80. The axial bolt 124 extends through aperture 126 in cap member 80 and into threaded aperture 100 in shaft 96. Bolts 128 extend through receiving aperture 130 in cap 80 and into threaded apertures 102 in shaft 96 to thereby maintain the annular head portion 78 in overlying and axially aligned relation with the body portion 76. The annular front head portion 78 has an irregular convex front surface or front cutting face 132 in which bit receivers 134 are positioned. Cutter bits 135 are secured in the bit receivers 134 and extend generally forwardly from the front cutting face 132. The front surface 132 is sloped so that the bits 134 extend forwardly from the cutter head at an acute angle to the longitudinal axis of the cutter head.

The front surface 132 has raised bit receiving surfaces 136 and alternate recessed bit receiving surfaces 138. FIGURE 3 is taken along the line 3—3 in FIGURE 2 and the upper bit 135 in FIGURE 3 is positioned in a bit receiver 134 on the elevated bit receiving surface 136 and the bit 135 illustrated at the lower portion of FIGURE 3 is in a recessed bit receiving portion 138. The raised bit receiving portions 136 are sloped and so arranged that the longitudinal axis of the bit is at a 45° angle with the longitudinal axis of the cutter head 72. The lower recessed portions 138 are sloped at a different angle so that the longitudinal axis of the bit is at an angle of 30° with the longitudinal axis of the cutter head 72. The bit receivers 134 are positioned in elevated bit receiving portions 136 in a manner that the rectangular bit receiving recesses 140 are arranged in a circular configuration about the axis of the cutter head. The rectangular recesses 140 have a transverse axis deviating about 15° from an axis generated radially as is illustrated in FIGURE 2. Similarly, the recessed bit receiving surfaces 142 have bit receivers 134 positioned therein so that the rectangular bit receiving apertures 142 are also arranged equidistantly from the axis of the cutter head and have their transverse axis at an angle of about 15°.

The shaft 96 is connected to the drive gearing as previously described to rotate the cutter head 72 relative to the tubular member 74. The cutter bits 135 are arranged upon rotation to dislodge material from the face as is described in U.S. Patent Re. 25,470. If the bits 135 encounter a resistance that exceeds the shear strength of the shear pins 122, the shear pins 122 break or shear along the recessed portion 121 and disconnect the cutter head front head portion 78 from the body portion 76 to relieve the stresses on the drive gearing. Although the various angular relationships between the components of the cutter head and the drill bits positioned thereon provide an efficient cutter head, it should be understood that these angular relationships are stated for exemplary purposes only, and it is not intended to confine the herein above described invention to these particular angular relationships.

While there is in this application specifically disclosed one form which the invention may assume in practice, it will be understood that this form is shown for purposes of illustration and that the invention may be modified and embodied in various other forms without departing from its spirit or the scope of the appended claims.

According to the provisions of the patent statutes, the principle, preferred construction and mode of operation of the invention has been explained and what is considered to represent its best embodiment has been illustrated and described. However, it should be understood that within the scope of the appended claims, the invention may be practiced otherwise than as specifically illustrated and described.

We claim:
1. A rotatable cutter head comprising,
a tubular support member,
a drive shaft coaxially positioned in said tubular support member for rotation relative thereto,
a cutter head body portion secured to said shaft member for rotation therewith,
a front head portion positioned in overlying relation with said body portion,
cutting means secured to said front head portion and extending therefrom,
said cutter body portion and said front head portion having aligned shear pin receiving portions,
shear pins positioned in said respective shear pin receiving portions and connecting said front head portion to said body portion for rotation therewith,
said drive shaft arranged to rotate said body portion and said front head portion through said shear pin connection, said shear pins arranged to shear and disengage said front head portion from said body portion when said shear pins are subjected to a shear force exceeding the shear strength of said shear pins thereby disengage said front head portion from said body portion.

2. A rotatable cutter head as set forth in claim 1 which includes, a cap member positioned in overlying relation with said front head portion,
means of securing said cap member to said shaft member for rotation therewith, said cap member operable to maintain said front head portion in overlying relation with said cutter head body portion.

3. A rotatable cutter head as set forth in claim 1 which includes,
an annular bearing support member with a central passageway therethrough, said support member positioned on the front annular surface of said tubular support member,
said drive shaft extending through said passageway and having an intermediate portion rototably supported therein,
said shaft member having an enlarged end portion extending beyond said support member,
said cutter head body portion having an annular configuration and axially positioned relative to said shaft member enlarged end portion,
means securing said annular body portion to said shaft enlarged portion for rotation therewith.

4. A rotatable cutter head as set forth in claim 1 in which,
said front head portion having an annular configuration with a convex front surface,
said cutter means extending from said convex surface at an acute angle to the axis of said shaft,
a cap member positioned in overlying relation with said front head portion and secured to shaft member for rotation therewith, said cap member operable to maintain said front head portion in overlying relation with said cutter head body portion.

5. A rotatable cutter head as set forth in claim 4 in which,
said annular convex surface has raised cutter bit receiving surfaces and alternate recessed cutter bit receiving surfaces,
said raised cutter bit receiving surfaces arranged so that the longitudinal axis of said cutter bit is at an angle of about 45° to the axis of said drive shaft,
said recessed bit receiving surfaces arranged so that the longitudinal axis of the cutter bit is at an acute angle of about 30° with the axis of the drive shaft.

6. A rotatable cutter head as set forth in claim 1 in which,
said cutter means includes a first plurality of bits arranged in a circular configuration about the axis of the cutter head and a second plurality of bits arranged in a second circular configuration about the axis of the cutter head with a radial dimension less than the circular configuration of said first plurality of bits.

References Cited
UNITED STATES PATENTS

| | | | |
|---|---|---|---|
| 1,740,838 | 12/1929 | Roesen | 64—28 |
| 1,923,132 | 8/1933 | Witkin | 64—28 |
| 2,866,626 | 12/1958 | Moon | 299—57 |
| 3,033,542 | 5/1962 | Rosler | 64—28 X |
| 3,301,006 | 1/1967 | Sharp | 64—28 X |

ERNEST R. PURSER, *Primary Examiner.*